United States Patent [19]

Steele et al.

[11] Patent Number: 4,930,027
[45] Date of Patent: May 29, 1990

[54] METHOD AND APPARATUS FOR TAPE SPEED OVERRIDE OPERATION WHEN RECOVERING HELICAL AUDIO

[75] Inventors: Robert B. Steele, Menlo Park; Leonard A. Pasdera, San Carlos, both of Calif.

[73] Assignee: Ampex Corporation, Redwood City, Calif.

[21] Appl. No.: 275,257

[22] Filed: Nov. 23, 1988

[51] Int. Cl.$^5$ .................. G11B 15/473; H04N 5/783
[52] U.S. Cl. ..................................... 360/70; 360/33.1; 360/19.1; 360/73.04; 360/36.2; 358/335; 358/312
[58] Field of Search ............... 360/19.1, 33.1, 36.2, 360/70, 73.04, 73.08, 36.1; 358/312, 335, 337, 338

[56] References Cited

U.S. PATENT DOCUMENTS

Re. 33,001  7/1989  Baldwin ............................ 360/19.1
4,679,098   7/1987  Williams et al. .................. 360/10.1

Primary Examiner—Aristotelis M. Psitos
Assistant Examiner—David L. Robertson
Attorney, Agent, or Firm—George B. Almeida; Douglas M. Gilbert

[57] ABSTRACT

A technique for recovering helical audio using the standard synchronous reference clock of the video tape recorder system to conventionally clock the transport and the video signal processor, including the video timebase corrector. A modified audio signal processor clock is generated which is varied commensurate with the desired rate of tape speed override, varying accordingly the flow of audio data through an audio timebase recorder. The speed of a helical scanner is varied in accordance with the rate of tape speed override, to lock the scanner angular position to the audio timebase corrector. In turn, a capstan servo adjusts the tape position in respsonse to the scanner angular position to lock the tape to the scanner. Meanwhile, the video signal processing proceeds conventionally by skipping or repeating fields or frames via a frame store to match the rate of tape speed override.

21 Claims, 3 Drawing Sheets

METHOD AND APPARATUS FOR TAPE SPEED OVERRIDE OPERATION WHEN RECOVERING HELICAL AUDIO

BACKGROUND AND SUMMARY OF THE INVENTION

The invention relates to tape speed override operation of a helical video tape recorder and, in particular, to a tape speed override system for faithfully recovering helically recorded digital audio signals via helical audio processing channels, while also recovering associated video signals.

In the television industry, and in the course of broadcasting pre-recorded movies, newscasts, commentaries and, particularly, advertisements of varying lengths, it is common for a television broadcast station to have occasions when it is highly desirable to be able to broadcast a recording in slightly less time, or slightly more time, than the length of the recording. For example, it may be desirable to broadcast a recorded tape having a length of 11 minutes in a time slot of 10 minutes, or in a time slot of 12 minutes. It is equally desirable to transmit the recording in its entirety, without omitting or repeating, or otherwise editing, any of its contents. The preferred manner for performing such a process has been to time compress or expand the playback of the recording and thus of the recorded material, generally by a playback process known in the field of television as tape speed override (TSO). As implied, the tape speed override mode of operation means that the tape is driven at a speed which is a selected percentage greater or less than normal play speed.

In the past, on video tape recorders with longitudinal audio channels such as analog helical recorders, time compression or expansion of recorded material, that is, TSO, were accomplished by varying the linear tape speed according to the desired degree of compression or expansion. In such recorders, the helically recorded video information is compressed or expanded by skipping or repeating fields or frames of video as required to match the average speed of the playback process. It follows that the associated audio channels on the longitudinal tracks simply are played back at the correspondingly faster or slower speed of the video tape.

However, in a rapidly developing field of, for example, digital video/audio recording/reproducing, very sophisticated digital video recorders employ a helically recorded audio format, wherein audio signals are recovered, along with video signals, via associated helical audio channels and the respective helically scanning, audio/video heads. Precise recovery of the audio presents significantly worse problems when dealing with such a helical audio format, since helically scanning heads as a rule, may be used to skip or repeat tracks of video in order to perform video special effects such as stop, slow motion, fast motion, etc. However, as is well known, audio must be continuously recovered since any interruption of the digital audio data will cause very objectionable pops and noise. Accordingly, the respective heads which also are tracking the helical audio cannot skip or repeat with the video since this would interrupt the digital audio data. This condition complicates the process of time compression or expansion as when using the process of tape speed override when reading out helical audio.

One solution to such a problem of recovering the helical audio and video signals, is to run the entire playback process off-speed by speeding up, or slowing down, the reference clock for the entire transport and signal processing system, thus compressing or expanding the recovered audio at the outputs of the helical audio channels, while also recovering the video. The processing systems used with such an off-speed reference clock include both the video TBC and an audio TBC, which can be clocked at the non-normal rate of the off speed reference clock.

However, this causes problems in the video signal processing circuit, and particularly at the recorder output, wherein the video timing pulses such as horizontal sync and color burst are now not at the correct rates, causing the video signal to be unusable by other equipment.

In this off-speed system however, the helical scanner also must be phase and frequency locked to the changing tape phase and frequency. In addition, the system also must be robust enough to handle all the other variables typical of such helical video tape recorders. These variables include interchange capabilities, temperature and humidity effects, track straightness and interchange insert edits. Typically, in video tape recorders with controllable scan tracking heads, a dither effect is added to the tracking elevation of the scan heads to find and keep the optimum scan position on the track. This technique solves most of the small tracking problems of previous mention.

To overcome the problem of the output video timing pulses being at the wrong frequency, it would be necessary to run the scanner and TBC with the correct television reference while the tape linear speed is at a non-normal rate. But this will cause a break in the audio signal when the tracking head is forced to jump. A jump is required to compensate for the elevation change due to a change in the linear tape position relative to the reference phase-locked scanner. However, if the scanner is unlocked and run at a frequency proportional to the tape speed, the elevation will not change and head jumping is not required. Thus, the audio signal may be contiguously recovered, which is the ultimately desired result.

In the helical audio/video tape recorders of previous discussion, it is thus highly desirable to run the transport from a variable reference and the video signal processing circuits at a constant standard synchronous reference, and to allow the video TBC and the controllable scan tracking heads to operate in conventional fashion as when performing in the normal play mode. In addition, it is equally desirable to then run the audio signal processing circuits fast or slow as required, while keeping the audio circuits on a reference clock which is running at the desired TSO rate. In this way, the audio can be loaded at a faster or slower rate, and read out at an equally faster or slower rate, to provide TSO without causing problems in the video signal processing.

An immediate problem caused by using a constant reference in the TSO mode is that the recorder system now must feed more or less data into and out of the system. However, it must be remembered that the scan tracking heads cannot be allowed to jump, since they also are reading out audio signals which cannot be interrupted or repeated. Accordingly, if more audio and video data are to be handled, the transport speed must be increased, which causes its phase to be changed proportionaly. As a result, as previously mentioned, the scanner breaks lock and its phase will wander relative to the phase of the control track, that is, relative to the tape speed, if the tape speed is not changed.

The present invention overcomes the problems and disadvantages in the helical audio system of previous mention, when operating in the TSO mode, while allowing a range of TSO operation generally of the order of ±15%, but which could be larger. More particularly, the invention uses a constant standard reference clock to run the transport and video signal processing systems, to thereby alleviate the problems of previous mention associated with non-normal video signal processing. In addition, the tape speed is increased or decreased to provide the desired TSO rate while the scanner speed is increased or decreased proportionately to keep the scanner and tape in phase-locked condition to prevent head jumping of tracks. Given the example of TSO of faster than normal rate, for example, 10% or 1.1 faster, the invention slowly increases the speed of the scanner. In order to maintain phase lock, the speed of the tape and thus of the control track, is increased proportionately. Since more audio data now is being recovered from tape, there is the risk of overrunning the audio TBC, thereby spilling bits of audio data and causing an objectionable break in the audio signal.

To circumvent the overrunning of the audio TBC, the rate of the audio clock is increased to thereby increase the readout of data from the TBC. As the TBC contents drain to a preselected level, for example, one-half of the contents as represented by the center of a TBC time window or range, the continued drain is in effect "detected", and an error or correction signal is generated. The scanner speed then is increased in response to the correction signal indicative of the TBC centering. The tape position, or control track phase, is locked to the scanner angular position or phase. As the scanner velocity increases commensurate with the desired TSO rate, the tape speed is increased by means of control track and capstan servo loops, and the system stays in lock in the TSO mode without head jump or loss of any audio data. Meanwhile, the video signal processing is performed in conventional fashion with suitable skipping of pertinent fields or frames via a frame store to provide the video data compression required to match the audio data compression.

It may be seen that the present invention employs a concept of synchronized cueing such as described in copending U.S. patent application SN-036,630, filed Apr. 10, 1987, Apparatus And Method assigned to the same assignee as this application. The subject matter of the prior application is incorporated herein by reference. In the copending application, the system synchronizes to a linearly moving position (a moving cue location) and thus is concerned with a velocity change Conceptually, in the TSO mode of this application, the system synchronizes to a moving phase, that is, synchronizes to phase instead of position as in the prior application, and herein is concerned with phase change in addition to velocity. To this end, the invention utilizes, in effect, the contents level or time window center of the audio TBC to derive an error or control signal indicative of the positional error of the scanner relative to the audio data, and then derives another signal indicative of the positional error of the control track relative to the scanner position. The current phase of the scanner is predicted, and the resulting signal is applied as a positional error to correct the speed of the tape via the capstan servo. The TSO nominal velocity of the scanner is known, since it is the desired TSO rate, and thus is the corresponding audio data rate desired at the video tape recorder system output.

By way of example, the invention includes an audio TBC in a video tape recorder (VTR) with a helical audio format, and a scanner servo with an associated scanner and tach. The TBC normally is clocked with an audio clock signal of 48 kiloHertz(KHz) derived from an 18 megaHertz(MHz) audio clock generator. However, the nominal frequency of the 48 KHz signal is modified slightly during TSO via a TSO rate signal commensurate with the desired data compression or expansion. A CPU is supplied with a digital number indicative of the desired scanner operation and, in turn, supplies a phase comparator with a phase error signal indicative of a scanner speed required to maintain a selected data content in the TBC. The phase comparator also receives a scanner tach phase signal from the scanner. The comparator supplies the result of the comparison of the signals to the scanner servo, which then drives the scanner. The scanner tach also supplies the scanner tach phase signal to a control track servo, which also receives a control track signal from a control track head in generally conventional servo arrangement. The control track servo is coupled to a capstan servo which drives a capstan and its associated capstan tach to maintain a selected, constant, tape to scanner phase relationship to thus prevent a scan head from jumping tracks. A capstan tach signal is supplied as feedback to a second input of the capstan servo in generally conventional servo arrangement.

It may be seen that the scanner is responsive to the error signal from the CPU commensurate with the audio TBC contents, and the capstan servo and control track servo are responsive, in turn, to the scanner tach signal to maintain a phase-locked condition therebetween. Thus, contrary to normal VTR operation, in the TSO mode of operation in accordance with the preferred embodiment of the invention, the conventional functions of the scanner servo and of the control track and capstan servos, relative to the audio signal playback processing circuits, are reversed.

DESCRIPTION OF THE PREFERRED EMBODIMENTS

Figure 1:
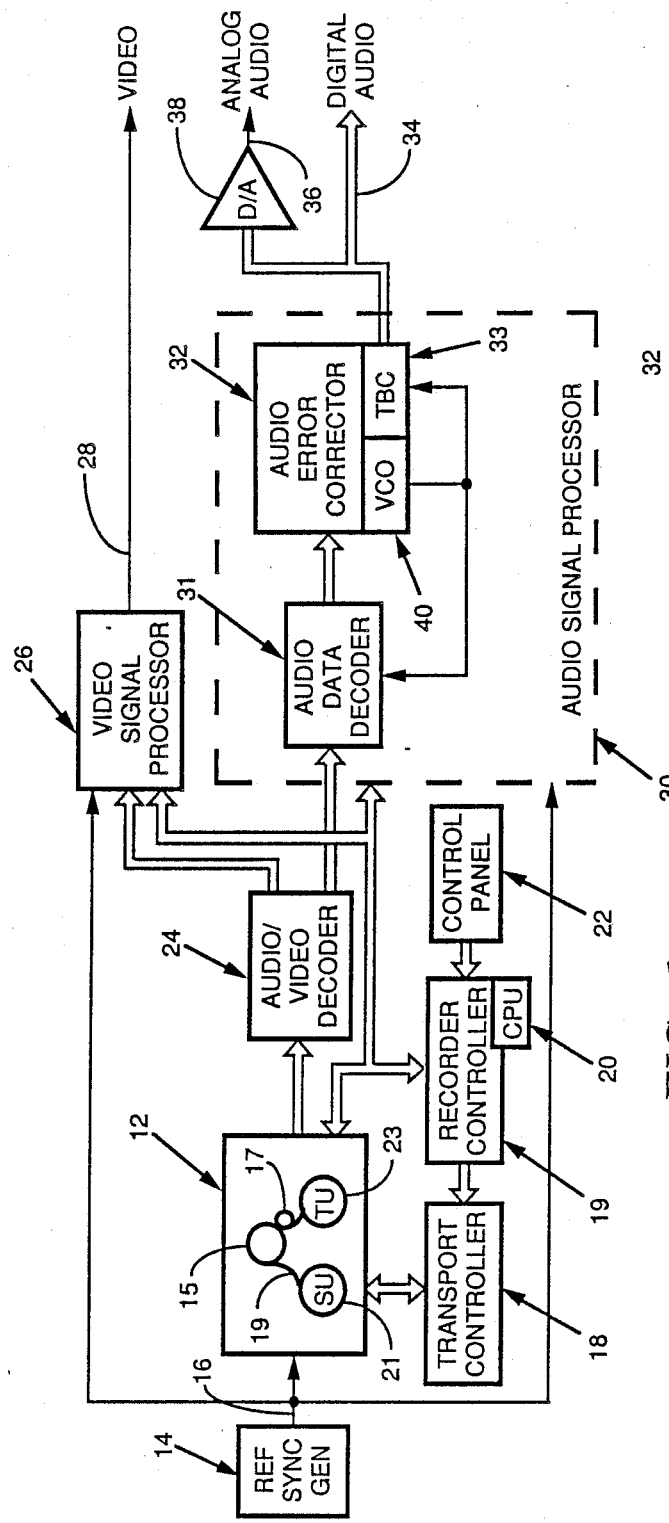
FIG. 1 is a block diagram depicting broadly the environment of the invention.

Referring to FIG. 1, a helical digital video recorder (VTR) 12 is supplied with a standard reference sync signal via a reference sync generator 14 and a line 16. The reference sync signal is a conventional sync signal used with the video tape recorder 12 for the respective NTSC, PAL, PAL-M, and other, colored television standards. The VTR 12 includes a conventional scanner 15, and a capstan 17 for transporting a magnetic tape 19 about the scanner 15, back and forth between supply and takeup reels 21, 23. Controls for the signal system and transport of the VTR 12 conventionally are provided by a transport controller 18, a recorder controller 19 coupled to the transport controller 18 and to the VTR 12, and a control panel 22 coupled to the recorder controller 19 for providing the usual operator control interface to the VTR. The controllers are controlled in turn via a central processing unit(CPU) 20. The audio/video outputs from the VTR 12 are supplied to an audio/video data decoder 24 in conventional fashion which, in turn, supplies a video signal to a conventional video signal processor circuit 26. The video signals are processed in usual fashion via a time base corrector (not shown) in the circuit 26, in response to control signals from the CPU 20, and thence are supplied as the video signal via an output bus 28 in either the analog or digital format in generally conventional fashion.

The audio signal is separated from the video signal via the data decoder 24 and is supplied to an audio data decoder 31 of an audio signal processor circuit 30. The decoder 31 decodes the audio data in conventional fashion. The decoded audio is supplied to an audio error corrector 32 which provides conventional error correction. The audio signal processor circuit 30 also provides time base correction via an audio time base corrector (TBC) 33, and also provides the digital audio output therefrom on a bus 34, or its analog audio equivalent on a bus 36 via a digital/analog (D/A) converter 38. The audio signal processor circuit 30 also is controlled by the CPU 20.

A voltage controlled oscillator (VCO) 40 provides an internal clocking signal for the audio error corrector 32, for the audio data decoder 31, and for the audio TBC 33 generally depicted within the audio signal processor 30. It is this internal clock which is modified in accordance with the invention, to provide the audio data compression or expansion commensurate with the degree of desired TSO.

As depicted, the video signal processor circuit 26 and the audio signal processor circuit 30 are clocked by the constant synchronous reference signal supplied via the synchronous reference generator 14 on line 16.

Thus it may be seen that contrary to operating a video tape recorder in a TSO mode, wherein the synchronous generator provides a reference signal of modified frequency to the entire VTR system, the present invention contemplates supplying a standard synchronous reference signal of constant frequency to the entire VTR system; namely, to the tape transport 12, the control circuits, the video signal processor circuit 26 and the audio signal processor circuit 30. The audio data compression or expansion is instead provided in accordance with the invention, by modifying an internal audio signal processing clock, while altering the usual coordinated functions of the audio TBC and the scanner, control track and capstan servos, to provide cooperative functions therebetween when in the TSO mode.

Figure 2:
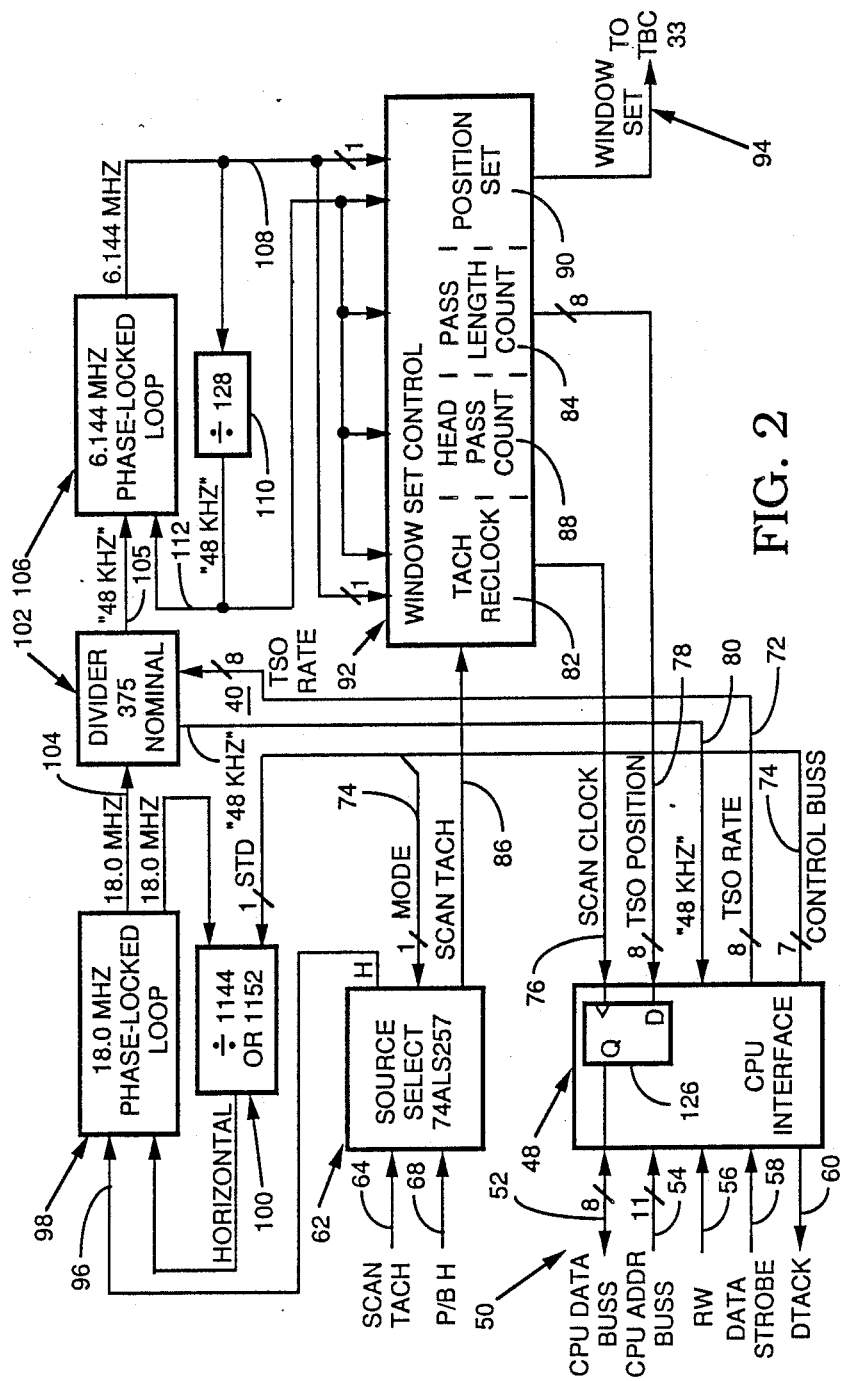
FIG. 2 is a block diagram depicting the audio signal processor voltage controlled oscillator of FIG. 1, in combination with a controlling CPU interface.

Referring now to FIG. 2, portions of the circuit of FIG. 1 are illustrated in greater detail with reference to similar numerals, while the various control and status signals supplied to and from the invention combination and the CPU 20 of FIG. 1, also are depicted. More particularly, the various communications to and from the CPU 20 are coupled to a CPU interface 48 via a plurality of busses and lines generally designated via a numeral 50. A pair of busses 52, 54 provide a bi-directional CPU data bus and an address bus, respectively. A read/write signal(RW) and a DATA STROBE signal are supplied to the CPU interface 48 via lines 56, 58, respectively, while the interface supplies a signal DTACK back to the computer via a line 60.

In addition, the recorder controller 19 of FIG. 1 provides control signals to a source select circuit 62 in the audio signal processor 30 of FIG. 1, during playback and TSO modes. The signals include a scanner tach signal(SCAN TACH) on a line 64 and a playback horizontal reference signal(P/B H) corresponding to the reference sync signal of previous mention, on a line 68.

The CPU interface 48 provides a divider control bus 72 with a TSO RATE signal of 8 bits, and a control bus 74 of 7 bits, two bits of which are used in the circuit of FIG. 2. In turn, the interface receives a signal SCAN CLOCK on a line 76, a TSO POSITION signal of 8 bits on a bus 78 and a "48 KHz" signal on a line 80. SCAN CLOCK is supplied from a tach reclock circuit 82 while TSO POSITION is supplied from a pass length counter 84. The tach reclock circuit 82 is supplied with a signal SCAN TACH via a line 86 from the source select circuit 62. The tach reclock circuit 82 and the pass length counter 84, along with a head pass counter 88 and a position set circuit 90, form a window set control circuit 92. The position set circuit 90 supplies a signal WINDOW SET on a line 94, for resetting the TBC 33 of FIG. 1 in accordance with the invention as further described below.

A horizontal signal(H), corresponding to the P/B H signal, is supplied by the source select circuit 62 to a phase locked loop (PLL) 98 operating at 18.0 megahertz (MHz), via a line 96. The signal H on line 96 is the horizontal reference of the standard which is being used. Thus the 18.0 MHz PLL 98 is phase-locked to the system horizontal sync reference and may be employed for both the PAL or PAL-M 625, or the NTSC 525 color television standards, as controlled via STD and MODE signals on the control bus 74. A divider 100 receives the 18.0 MHz signal and divides by either 1,114 or 1,152 as determined by the signal STD. The PLL 98 then provides an 18.0 MHz signal to a divider 102 via a line 104, regardless of which standard is being used. Divider 102 provides a nominal divisor of 375 when in the normal play mode of operation. However, when in the TSO mode of operation, TSO RATE on line 72 changes the divisor of 375 to another value commensurate with the degree of compression or expansion desired.

In general, the rate of TSO generally is within a range of the order of ±15% of nominal VTR play speed, and the divisor of divider 102 is witin a range of the order of from 319 to 431. However, the invention techniques may be employed in systems with a greater TSO range. When operating nominally, as when in normal play mode, the divider 102 provides a 48 KHz signal to a 6.144 MHz phase lock loop 106 via a line 105, and also to the CPU interface 48 via the line 80. The 48 KHz signal is shown in quotes, indicating that the frequency generated by the divider 102 is not always exactly 48 KHz but varies about the nominal value of 48 KHz, in response to TSO RATE which decreases or increases the 375 divisor value in accordance with the degree of compression or expansion desired. In turn, the PLL 106 supplies a 6.144 MHz signal on a line 108, which frequency is required to implement an audio serial transmission means in accordance with the Audio Engineering Society AES3-1985 (ANSI S4.40-1985) format. The AES transmission means circuitry is not shown herein as it is not required for a description of the invention. The 6.144 MHz signal is supplied to a divider 110 with a divisor of 128. The resulting "48 KHz" signal is fed back into the PLL 106 via a line 112.

The line 112 also supplys the "48 KHz" signal to the tach reclock circuit 82, the head pass counter 88, the pass length counter 84 and the position set circuit 90. In addition, the 6.144 MHz signal is supplied via the line 108 to the tach reclock circuit 82 and the position set circuit 90. The PLL 106 locks to the changeable "48 KHz" signal supplied by the divider 102.

In normal play mode, the 18.0 MHz is locked to horizontal H, and the divisor for the divider 102 is 375, whereby the divider 102 provides a signal of exactly 48 KHz on line 105. In addition, the audio TBC 33 operation is timed with respect to the scanner 15 whose servo, along with the capstan and control track servos, are locked to the reference sync generator 14. The relative functions of the various components in normal play mode are further discussed in FIG. 3 below.

In the event the TSO mode is requested, the 48 KHz signal is correspondingly modified to provide the "48 KHz" signal commensurate with the digital value of the TSO rate signal from the CPU to the divider 102 on the line 72. The CPU 20, in turn, is directed to the desired TSO mode via the control panel 20 depicted in FIG. 1. Since the CPU 20 can only divide the 18.0 MHz signal by discrete numbers, it generally must select between a pair of discrete numbers, and particularly selects the closest discrete number as an initial divisor value. For example, if the CPU 20 has a choice between the discrete numbers 369 or 370, it selects the closest of these two discrete numbers for a discrete period of time. As the divisor value shifts closer to the other number, the CPU 20 will select it for the remainder of the TSO compression/expansion mode interval.

It may be seen that the result of modifying the "48 KHz" signal is to clock the window set control circuit 92 slightly faster or slower depending upon the selected degree of compression or expansion. Thus, given a specific value of TSO operation, if the number computed by the CPU 20 lies half-way between the two numbers of previous mention, 369 and 370, the CPU 20 may select one of the numbers, for example 370, for one-half of the playback interval. At precisely one-half of the interval the CPU then switches the divisor to 369 for the rest of the TSO playback interval.

Thus, directing the VTR 12 into the TSO mode of operation, slightly changes the frequency of the "48 KHz" signal which is applied by the line 112 to modify accordingly the clocking rate supplied to the window set control circuit 92. In response, the WINDOW SET signal on line 94 controls the reset of the TBC 33 (FIGS. 1,3) whereby the digital or analog audio data supplied on either of the busses 34, 36 are expanded or compressed in time at the desired TSO rate. In particular, the increase or decrease of the digital audio rate through the TBC 33, as determined by the change in the clocking rate of the "48 KHz" signal, causes a proportionate increase or decrease in the speed of the scanner 15 previously depicted in FIG. 1. Thus, when in the TSO mode of operation, the speed, or more particularly the angular position, of the scanner is, in effect, locked to the modified "48 KHz" clocking rate in accordance with the invention. Since the scanner 15 must remain in phase with the phase of the control track signal on the tape 19, the scanner tach phase is supplied to a control track servo 148 and thence to a capstan servo 150 which direct the capstan 17 to increase or decrease the rate of the tape movement. Thus, the capstan 17 is locked to the scanner 15 thereby maintaining the phase of the scanner relative to the phase of the control track constant, thereby preventing a scan tracking head from jumping tracks, as further described below with reference to FIG. 3.

Figure 3:
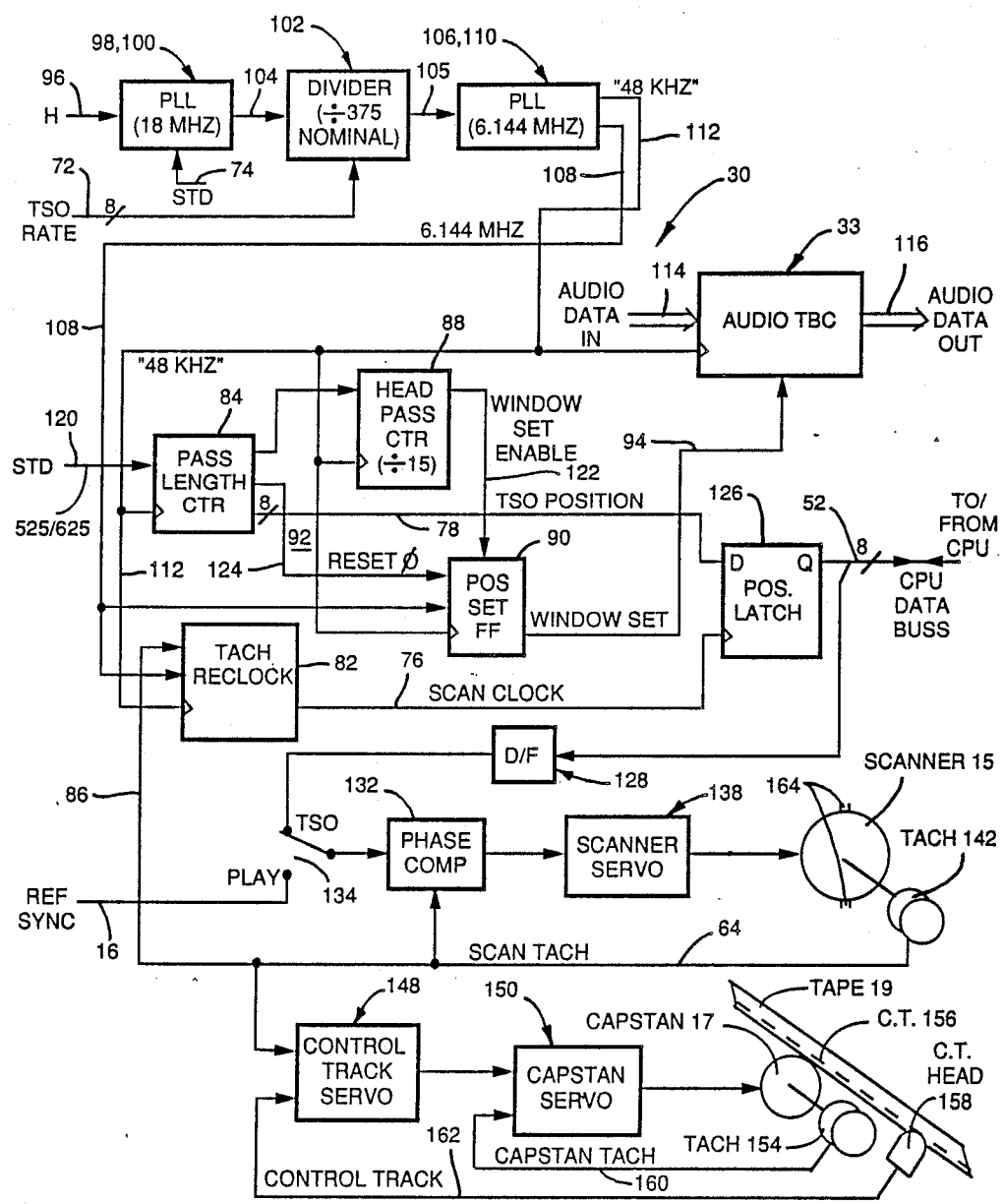
FIG. 3 is a block diagram illustrating embodiments of the invention in combination with various servo circuits.

Referring now to FIG. 3, there are depicted the various servo circuits which integrally are locked to the processing of video and audio data. In a TSO mode of operation, the video clocking reference remains the conventional reference sync signal of the respective standard, and any compression or expansion of the video is performed in the conventional manner by skipping or repeating fields or frames of video using a frame store located in the video signal processor 26. However, the audio clocking rate generated by the PLL circuit 106 of the audio signal processor 30 is modified commensurate with the TSO rate desired, which modifies accordingly the rate of audio signal processing. This, in turn, causes the scanner 15 to follow the TSO rate of digital audio processing. The scanner speed and thus angular position, is reflected in a scanner tach signal and causes the control track and capstan servos, and thus the capstan 17, to follow the scanner 15 to maintain the tape 19 in a selected linear position relative to the scanner angular position, that is, which maintains the control track in phase with the scanner phase.

To this end, in FIG. 3, the H signal related to horizontal sync of the pertinent color television standard, is supplied to the PLL 98,100, with the resulting 18.0 MHz signal that is supplied to the divider 102 on line 104 being locked to horizontal sync. The signal STD supplied to the PLL 98,100 via the line 74 determines the value of the divisor of the divider 100(FIG. 2) required to generate the 18.0 MHz signal regardless of the standard. In turn, the divider 102 supplies the "48 KHz" signal to the PLL 106, 110 on the line 105, as previously described in FIG. 2, to provide the "48 KHz" and the 6.144 MHz signals on the lines 112, 108 respectively. TSO RATE is supplied as a digital 8 bit value via the line 72 to the divider 102, to modify the nominal divisor 375 to some other number in accordance with the desired TSO rate of operation as previously described in FIG. 2

The audio TBC 33 of the audio signal processor 30 is shown in FIG. 3, with digital audio data being supplied thereto via an audio data input bus 114, and with processed digital audio data supplied therefrom via an audio data output bus 116. The processor 30 and thus the audio TBC 33, is clocked via the "48 KHz" signal, whereby the rate of the data processing is controlled when in TSO operation by the modified frequency of the "48 KHz" signal. That is, the rate at which the audio signal is processed, automatically follows the frequency of the modified "48 MHz".

FIG. 3 illustrates the window set control circuit 92 in further detail. The "48 KHz" signal supplies the clock to the pass length counter 84, the tach reclock circuit 82, the head pass counter 88 and the position set circuit 90. The 6.144 MHz signal is fed to the tach reclock circuit 82 to re-time the "48 KHz" signal to insure that the clocks are coherent with 6.144 MHz. The 6.144 MHz also is supplied to the position set circuit 90 to clock an output buffer D-type flip-flop(not shown), which forms part of the circuit 90.

While the variations in the "48 KHz" signal correspondingly change the rate of audio signal processing, it is the WINDOW SET signal on the line 94 extending to the audio TBC 33 from the position set circuit 90, that insures that the TBC 33 is in proper time alignment to receive the digital audio data at a time corresponding to the center of the TBC 33 time window or range. The window set control circuit 92 of FIG. 3 in effect accomplishes this condition.

By way of further explanation, as is known in the field of timebase correction, the basic technique of compensation for timebase errors in an audio or video signal involves sampling and writing data into a memory of a TBC at one frequency, and thereafter reading the data samples from the TBC memory at some other frequency. One of the frequencies is derived from the time-unstable playback, and the other from a stable reference. In general, the playback timing is adjusted so that the average delay through the TBC is half the total available, maximizing the correction range. The total available delay, which ranges from one horizontal line time to a field or more, in effect, defines the time window during which the data is received and then recovered. Given a specified time window or "TBC range", it is preferrable to write data into the TBC at a time which corresponds to the center of the time window. This allows the greatest time base error correction in either direction without exceeding the limits of the TBC time window or range. Accordingly, for purposes of the description herein, the term "TBC centering" refers to the act of supplying the audio data to the memory of the audio TBC 33 at a time corresponding to the center of the TBC time window. More particularly, "TBC centering" is thus a reference indicative of the data content of the TBC 33, and which is used herein as indicative of the optimum level of the TBC 33 data content. It is this TBC time window centering that is used as a reference by the scanner to lock the scanner to the TBC.

To insure that the TBC receives the audio data at the TBC time window center, the pass length counter 84 is clocked by the "48 KHz" signal and continuously counts the passes of audio/video heads 164 across the recording tape 19, further discussed below. In the TSO mode, the pass length counter 84 essentially is free running. A standard signal (for example, 525/625) is provided on a line 120 and is indicative of which color television standard is being used. Given a digital VTR with a D2 recording format such as used in the digital videotape recorder, VTR-300, manufactured by Ampex Corporation, Redwood City, California, in the NTSC 525 line system, the pass length counter 84 counts 267 audio samples for 14 head passes and then counts 266 audio samples for 1 head pass, in accordance with the D2 recorder specification In the PAL system, the pass length counter 84 continuously counts 240 audio samples for each head pass. Obviously, in a different format a different number of samples, or head passes, may be used. In this example, the counter 84 counts around itself for each head pass in any television standard, and outputs one "48 KHz" pulse at the end of each head pass. The output is supplied to the head pass counter 88 which is a divide-by-15 counter, that counts 15 head passes and then provides a WINDOW SET ENABLE signal on a line 122, to allow the WINDOW SET pulse to occur on line 94. The pass length counter 84 also supplies a RESET PHASE signal on a line 124 extending to the position set circuit 90, which generates the correct WINDOW SET pulse timing on line 94. In addition, the pass length counter 84 provides TSO POSITION of previous mention to a position latch 126 via the 8 bit bus 78.

The tach reclock circuit 82 re-clocks the SCAN TACH signal received on the line 86 using the "48 KHz" signal to make the internal processing coherent, and supplies the SCAN CLOCK signal as a re-clocked scanner tach signal indicative of the scanner 15 angular position, and/or of the speed, on the line 76. SCAN CLOCK is used to latch the digital number representing the TSO POSITION signal onto the bi-directional 8 bit CPU data bus 52 via the position latch 126. The digital number is used by the CPU 20 to determine where the scanner 15 is relative to where it should be, and to then increase or decrease the speed of the scanner to properly position the scanner phase relative to the center of the audio TBC 33 time window of previous discussion. The position latch 126 actually is located in the CPU interface 48 of FIG. 2 as depicted in FIG. 2.

Accordingly, it may be seen that the window set control circuit 92 provides a number of different functions, one of which is to specify a finite time, or window, during which it is acceptable for the memory processing within the TBC 33 to receive the off-tape audio data. This window position relative to the tape is established by looking at the pulse edge of the SCAN TACH signal on lines 64, 86. Since the timing of the audio signal relative to SCAN TACH is known and constant, the TBC 33 can be forced to a particular alignment with respect to the incoming audio signal. The WINDOW SET signal on the line 94 provides this reset function for the TBC 33 at the proper time.

In addition, the CPU 20 must decide at what frequency the VCO 40 (FIGS. 1, 2) must operate in order to provide the required TSO rate of audio signal processing, and then must supply the proper digital number for forcing a scanner servo 138 to make it lock to the pass length counter 84 via the TSO position numbers on the bus 78. To this end, when a desired TSO rate is supplied via the control panel 22, the CPU 20 notifies the circuitry that it is going to operate in TSO via the TSO RATE signal on the line 72. It also stops resetting the phase of the TBC 33 relative to the scanner 15 as performed in the normal play mode. The scanner servo 138 also ignores the conventional synchronous generator reference input (for example, REF SYNC on line 16) since it no longer has any phase relationship to the audio data rate. Instead, the CPU 20 begins reading the 8 bit number being latched on the CPU data bus 52 via the position latch 126 and uses it to control the scanner servo 138. The CPU 20 analyzes the number to decide whether it is the correct number for the TSO rate desired. The CPU 20 then supplies a digital control value indicative of the nominal TSO value and the positional error, via the bi-directional CPU data bus 52 to a digital-to-frequency (D/F) converter 128, and thence to a TSO contact of a mode switch 134. Thus, if the scanner 15 is not in the right phase relative to the audio TBC processing range center, the TSO POSITION number will not be the right value. The CPU 20 detects this and supplies a digital control value to the scanner servo 138 via the D/F converter 128 which directs the scanner 15 to speed up or slow down accordingly. When the TSO POSITION value matches the preselected value indicative of phase lock between the scanner 15 and the audio TBC 33 processing center, the CPU 20 returns the D/F converter 128 state to a value which stops speed increases or decreases and maintains the scanner 15 at its correct TSO speed.

The common contact of the switch 134 is coupled to a phase comparator 132, which in turn is coupled to a scanner servo 138 which drives the scanner 15 and its associated tachometer 142. The tach 142 supplies the scanner tach signal(SCAN TACH) of previous mention back to the phase comparator 132 via the line 64, to complete a scanner servo loop. In addition, the SCAN TACH signal is fed via the line 86 to the tach reclock circuit 82. SCAN TACH is a conventional tach signal of pulses indicative of speed, once-around information supplying angular position, and doublet pulses supplying color field sequence The play contact of the mode switch 134 is coupled to the conventional reference sync generator 14 (FIG. 1) via the line 16.

The SCAN TACH signal also is supplied to the generally conventional control track servo 148 of previous mention via the line 64. The control track servo is coupled to the capstan servo 150, also of previous mention, which drives the capstan 17 and its associated tachometer 154. The CAPSTAN TACH signal from the tach 154 is coupled back to an input of the capstan servo 150 in conventional manner via a line 160 to complete a capstan servo loop. The tape 19 is driven via the capstan 17 in generally conventional fashion. A control track head 158 is disposed to read a control track 156 recorded on the tape 19, and to supply a CONTROL TRACK signal as the input to the control track servo 148 to complete a control track servo loop via a line 162 in generally conventional fashion. Thus a tape to scanner phase-locked condition may be maintained which prevents head jumping.

Unlike the conditions described above with respect to the TSO mode, when in normal play mode, all the servos of, for example, FIG. 3 are locked to the standard horizontal signal such as REF SYNC on line 16 via the mode switch 134. In addition, as previously mentioned, the 18.0 MHz signal is locked to horizontal (as in the TSO mode also) but the divisor of divider 102 is set to 375 so that the PLL 106 outputs exactly 48 KHz. The audio TBC 33 also must be correctly centered with respect to the scanner angular position, or phase, where the scanner now in the normal play mode is controlled by the signal REF SYNC via the line 16 and switch 134, not by the TBC 33. To provide the TBC centering, the re-clocked SCAN CLOCK signal from the tach reclock circuit 82 is extracted via a reset circuit (not shown) and is used to set the pass length counter 84 to the proper phase relationship. In turn, the position set circuit 90 provides the WINDOW SET signal on line 94 at a time which drives the audio TBC 33 into its proper relationship relative to the scanner 15. Thus, SCAN TACH steers the pass length counter 84 which, in turn, steers the TBC 33. In the TSO mode of the invention, the counter 84 is free running, and the TBC steers the scanner, as previously described.

There are various alternatives contemplated within the invention combination. For example, the SCAN TACH signal fed to the control track and capstan servos 148, 150, respectively, may be any other signal which is indicative of the proper tape position to scanner angular position relationship, and which causes the control track and capstan servos to modify the capstan 17 to drive the tape 19 into proper phase relative to the phase of the scanner 15. For example, the signal may be derived from the tracking elevation signal generated by a controllable scan tracking head. Furthermore, servo systems typical of the servo circuits herein are illustrated, for example, in the VRR-3 Video Production Recorder Service Manual, Cat. No. 1809594-04, issued January 1988 by Ampex Corporation, which subject matter is incorporated herein by reference.

What is claimed is:

1. A method for tape speed override in a video tape recorder having video and audio signal processing channels supplied with a standard reference signal, an audio timebase corrector in the audio signal processing channel, and a helical scanner for recovering helical audio data from a recorded tape, comprising:
   modifying the frequency of the standard reference signal in response to a desired rate of tape speed override to provide a modified audio channel reference clock;
   determining a time window for the audio timebase corrector in response to the modified audio channel reference clock;
   adjusting the angular position of the scanner in response to the audio timebase corrector time window; and
   adjusting the position of the recorded tape to the angular position of the scanner to provide a constant phase-locked condition therebetween at the rate of the tape speed override.

2. The method of claim 1 wherein modifying the frequency includes:
   generating a nominal audio clock;
   providing a rate signal indicative of said desired rate of tape speed override; and
   modifying the nominal audio clock in response to said rate signal.

3. The method of claim 1 wherein adjusting the scanner angular position includes:
   generating a digital number indicative of a center of the audio timebase corrector time window;
   determining a preselected digital control number indicative of the scanner being properly locked to the center of the time window; and
   adjusting the scanner speed to achieve a preselected relationship between the generated digital number and the preselected digital control number indicative of the proper lock.

4. The method of claim 1 wherein determining the center of the time window includes:
   resetting the time position of the timebase corrector in response to the audio channel modified reference clock; and
   detecting the angular position of the scanner relative to the time position of the timebase corrector to supply the audio data to the timebase corrector at the center of the time window.

5. The method of claim 1 wherein the helical scanner includes a scanning head, further including:
   determining the time period that the scanning head is recovering audio data from the recorded tape; and
   resetting the time window of the audio timebase corrector in response to determining the time period, to receive the audio data substantially at a center of the audio timebase corrector time window.

6. The method of claim 1 wherein adjusting the position of the recorded tape includes:
   producing a control signal indicative of the scanner angular position; and
   adjusting the movement of the recorded tape in response to the control signal.

7. A circuit for effecting tape speed override in a video tape recorder having an audio timebase corrector and a helical scanner for recovering helical audio data from a recorded tape, comprising:
   means for supplying the timebase corrector with a variable audio clock whose frequency is varied in response to a selected rate of tape speed override;
   means responsive to the variable audio clock for providing a digital signal indicative of a time window in the audio timebase corrector during which the recovered audio data are processed;

means for adjusting to an angular position of the scanner in response to the digital signal; and means for locking a linear position of the recorded tape to the scanner angular position to provide a constant phase-locked condition therebetween at the selected rate of tape speed override.

8. The circuit of claim 7 wherein the supplying means includes:

means for supplying a constant reference signal;

means for supplying a rate signal indicative of the selected rate of tape speed override; and means responsive to the rate signal for modifying the frequency of the constant reference signal to supply the variable audio clock.

9. The circuit of claim 7 wherein the providing means includes:

means for determining a center of the timebase corrector time window; and means for resetting the timebase corrector time window in response to the variable audio clock.

10. The circuit of claim 7 wherein the adjusting means includes:

means for determining a digital value indicative of a preselected relationship between the scanner angular position and the timebase corrector time window; and means responsive to the digital value and the digital signal for maintaining the preselected relationship between scanner and time window.

11. The circuit of claim 7 wherein the locking means includes:

means for providing a control signal indicative of a preselected relationship between tape linear position and scanner angular position; and means for adjusting the tape linear position in response to the control signal to maintain the phase-locked condition.

12. A circuit for tape speed override in a video tape recorder having an audio timebase corrector, and a helical scanner which recovers helical audio data from a recorded tape via a controllable scan tracking head, comprising:

means for modifying the recorded tape speed commensurate with a desired rate of tape speed override;

means for maintaining a predetermined constant tape to scanner phase relationship which prevents the controllable scan tracking head from jumping from one track to another; and means for adjusting the speed of the scanner to maintain a preselected timing relationship between the scanner phase and the timebase corrector.

13. The circuit of claim 12 including;

means for providing a variable audio clock whose frequency varies in accordance with a desired rate of tape speed override; and means responsive to the variable audio clock for establishing a time window for the timebase corrector during which it can accept audio data from the scanner.

14. The circuit of claim 13 wherein the adjusting means includes:

digital logic means for generating a digital number indicative of an incorrect timing relationship between scanner phase and timebase corrector;

processing means responsive to the digital number for supplying a control signal which adjusts the scanner to provide the preselected timing relationship.

15. A circuit for effecting tape speed override in a video tape recorder having a helical scanner with a controllable scan tracking head for recovering helical audio data from a recorded tape, comprising;

means for providing a variable audio clock indicative of a desired rate of tape speed override; and means responsive to the variable audio clock for moving the recorded tape at a speed commensurate with the desired rate while maintaining a selected phase relationship between the tape and scanner which prevents the scan tracking head from jumping between tracks to provide the faithful recovery of the helical audio data.

16. The circuit of claim 15 wherein the video tape recorder has an audio timebase corrector, wherein the moving means includes:

first means responsive to the variable audio clock for maintaining a selected timing relationship between the scanner and the timebase corrector.

17. The circuit of claim 16 wherein the first means includes:

means for establishing a time window during which the timebase corrector may receive the audio data; and means responsive to the variable audio clock for supplying a window reset signal which properly locates the time window to receive the audio data.

18. The circuit of claim 16 wherein the first means includes:

means for providing a preselected digital value indicative of the selected timing relationship between the scanner and the timebase corrector;

means for generating a new digital value indicative of the present timing relationship of the scanner and timebase corrector; and means for modifying the scanner speed to match the new digital value with the preselected digital value.

19. The circuit of claim 18 including:

processing means responsive to the present timing relationship for supplying consecutive new digital values to the modifying means to adjust the scanner speed until it achieves the selected timing relationship.

20. The circuit of claim 16 wherein the moving means further includes:

second means including capstan servo means for adjusting the speed of the tape to maintain the selected phase relationship between the tape and scanner.

21. A circuit for effecting tape speed override in a video tape recorder having an audio signal processor with an audio timebase corrector, and a helical scanner for recovering helical audio data from a recorded tape, comprising:

means for supplying a constant reference signal;

means for supplying a rate signal indicative of a selected rate of tape speed override;

oscillator means receiving the constant reference signal for generating a variable audio clock in response to said rate signal;

a window set control circuit responsive to the variable audio clock for setting a time window in the audio timebase corrector;

counter means responsive to the variable audio clock and to the scanner for providing a digital number indicative of the present timing relationship between the scanner and the timebase corrector;

processor means for determining if the digital number represents a desired timing relationship between the scanner and the timebase corrector and for generating a digital value indicative of the timing relationship;

scanner servo means for adjusting the scanner angular position in response to the digital value; and tape servo means including capstan means responsive to the scanner adjustment for maintaining the tape in a phase-locked condition with the scanner.

* * * * *